United States Patent [19]
Jenne et al.

[11] 3,944,970
[45] Mar. 16, 1976

[54] SEAT BELT MONITORING SYSTEM AND CONTROL DEVICE THEREFOR

[75] Inventors: Richard L. Jenne, Attleboro; Leo Marcoux; Thomas E. Evans, both of Rehoboth, all of Mass.

[73] Assignee: Texas Instruments Incorporated, Dallas, Tex.

[22] Filed: Nov. 1, 1974

[21] Appl. No.: 520,185

[52] U.S. Cl............. 340/52 E; 340/228 R; 323/69; 307/10 SB
[51] Int. Cl.²......................................... B60R 21/10
[58] Field of Search .......... 340/52 E, 228 R, 244 R, 340/239 R; 323/68, 69; 307/310, 10 SB; 73/204, 295

[56] References Cited
UNITED STATES PATENTS

| | | | |
|---|---|---|---|
| 3,475,745 | 10/1969 | White, Jr. ........................ | 340/244 R |
| 3,781,839 | 12/1973 | Bodge ............................. | 340/239 R |

*Primary Examiner*—Alvin H. Waring
*Attorney, Agent, or Firm*—James P. McAndrews; John A. Haug; Russell E. Baumann

[57] ABSTRACT

A system for monitoring usage of seat belt means in a motor vehicle includes electrically operable visual signaling means and electrically operable audible signaling means. A first switch is operable in response to initiation of motor vehicle operation for connecting the signaling means to an electrical power supply in the vehicle. An additional switch is operable in response to fastening of the vehicle seat belt means for preventing operation of the audible signaling means when the seat belt means are properly fastened. A pair of first electrical resistors of positive temperature coefficient of resistivity which are adapted to display a sharp increase in resistivity when heated to predetermined operating temperatures are arranged in series between the vehicle power supply and the visual and audible signaling means respectively for terminating operation of said signaling means individually when said first resistors are heated to said operating temperatures. A third electrical resistor of positive temperature coefficient of resistivity which displays a sharp increase in resistivity when heated to a predetermined operating temperature is arranged to be connected to said vehicle power supply on initiation of vehicle operation and is disposed in selected heat-transfer relation to said first resistors for heating said first resistors to their operating temperatures with a selected time delay after initiation of motor vehicle operation, thereby to terminate operation of said signaling means after said time delay even if said vehicle seat belt means have not been properly fastened. A control device particularly adapted for use in such seat belt monitoring systems includes a casing having a cavity and having a plurality of slots extending into the casing cavity. Three terminals are disposed in respective casing slots to dispose one end of each terminal within said cavity. The pair of first resistor elements are disposed in the casing cavity to electrically engage respective terminals and the second resistor is disposed in the cavity in heat-transfer relation to the first resistors to electrically engage each of the first resistors and to electrically engage a third terminal. A fourth terminal disposed in a fourth casing slot also electrically engages the second resistor and a cover secured to the casing retains the resistors and terminals in assembled relation. This control device is therefore adapted to be conveniently combined with existing automotive switch means to economically provide seat belt monitoring systems as above-described.

8 Claims, 7 Drawing Figures

SEAT BELT MONITORING SYSTEM AND CONTROL DEVICE THEREFOR

The use of seat belt means in motor vehicles has not been as widespread as might be desired and accordingly a number of seat belt monitoring systems have been used or proposed for use to remind vehicle occupants to use the vehicle seat belts. Such monitoring systems have included audible and visual signaling means which remind the vehicle occupants if motor vehicle operation is initiated when the seat belts have not been properly fastened. However, such known monitoring systems have been so annoying to vehicle occupants they are frequently then removed from the vehicle or otherwise circumvented to alleviate these annoyances. As a result the provision of such systems on motor vehicles have not been adequately effective in encouraging use of such seat belts. More recently a seat belt monitoring system has been proposed which would terminate operation of said signaling means automatically after a selected time delay even if the vehicle seat belts have not been properly fastened. However, the monitoring systems proposed have not been as conveniently adapted for use in monitoring seat belt use in various types of motor vehicles and it would be desirable if such recently proposed monitoring systems could be provided at a lower cost.

It is an object of this invention to provide a novel and improved seat belt monitoring system; to provide such a system which is effective to encourage more widespread use of seat belts in motor vehicles; to provide such a system which is particularly characterized by its versatility in application to various types of motor vehicles; to provide such a system which is of compact, rugged and economical construction; to provide a control device which is conveniently adapted to be combined with existing switch means in a motor vehicle to provide such improved seat belt monitoring systems; and to provide such a control device which is of very compact, versatile and economical construction.

Other objects, advantages and details of the novel and improved seat belt monitoring system and control device of this invention appear in the following detailed description of preferred embodiments of the invention, the detail description referring to the drawings in which.

Figure 1:
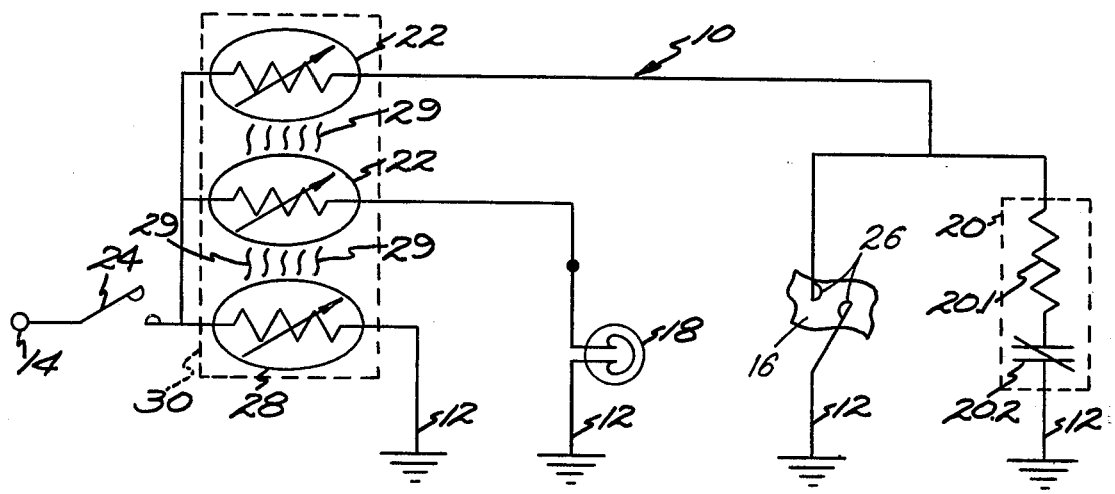
FIG. 1 is a schematic view of the preferred embodiment of the seat belt monitoring system of this invention.

Referring to the drawings, 10 in FIG. 1 indicates a preferred embodiment of the novel and improved automotive seat belt monitoring system of this invention which is adapted for use in monitoring seat belt usage in an automobile or other motor vehicle (diagrammatically indicated as the electrical ground in FIG. 1) where the vehicle has an electrical power supply B+ as diagrammatically indicated in FIG. 1 by the terminal 14 and has seat belt means diagrammatically indicated at 16 in FIG. 1. As shown, the monitoring system 10 of this invention includes an electrically operable visual signal means 18 such as an electrical lamp. As will be understood, the lamp 18 is adapted to be mounted on the dashboard of the motor vehicle 12 or in any other location where the light will be readily seen by the vehicle driver and by the passenger occupants of the vehicle. The system 10 further includes an electrically operable audible signaling means 20 which preferably comprises any conventional electrical buzzer system. Typically, for example, the electrical signaling means 20 comprises a coil 20.1 which provides a magnetic field when energized and a pair of normally closed electrical contacts 20.2, one of which is of spring leaf type adapted to be alternately attracted by the noted magnetic field to open the coil circuit and then to be resiliently biased back to a closed circuit position after the coil circuit has been opened, thereby to reclose the circuit, the opening and closing of the contacts providing a buzzing sound in well known manner. Such buzzer systems are well known, and as other conventional electrically operable audible means can be used for the monitoring system of this invention, the signaling means 20 is not further described herein. In accordance with this invention, the visual signaling means 18 is electrically connected in series with a first resistor means 22 of positive temperature coefficient of resistivity. Preferably, for example, the resistor means 22 comprises a ceramic-type resistor element which is adapted to display a relatively low resistance at a selected normal temperature such as room temperature but is adapted to be electrically self-heated by directing the electrical current through the resistor and to display a very sharp increase in resistivity when heated to a predetermined operating temperature for reducing current flow through the resistor element to a very low level. Typically, for example, the resistor element 22 incorporates a thin disc-like layer of lanthanum-doped barium titanate ceramic material having metallized contact surfaces on opposite side surfaces of the ceramic layer, such a resistor element typically displaying low resistance on the order of 4 ohms per resistor unit at room temperature and displaying a resistance of approximately 1000 ohms or more when heated to an operating temperature on the order of 90°C., thereby to reduce current flow through the resistor element 22 to a level which is just sufficient to maintain the resistor element at said operating temperature. That is, the resistor element 22 is adapted to be self-regulating to prevent excessive overheating of the resistor element when energized. As such ceramic resistor elements are well known, the resistor element 22 is not further described herein and it will be understood that the resistor element 22 is selected so that, when at its normal temperature, the resistor permits sufficient current flow through the resistor to operate the signaling means 18 but so that, when at its heated operating temperature, the current permitted to flow through the resistor is insufficient to operate the visual signaling means 18.

In accordance with this invention the seat belt monitoring system 10 further includes another first resistor means 22 of said positive temperature coefficient of resistivity characteristics which is connected in series with the audible signaling means 20 as illustrated in FIG. 1.

In accordance with this invention the seat belt monitoring system 10 further includes a first switch means 24 which is adapted to be operable in any conventional manner in response to initiation of operation of the motor vehicle 12 to electrically connect the signaling means 18 and 20, and the resistor elements 22 in series with the respective signaling means, to the electrical power supply 14 of the motor vehicle as illustrated in FIG. 1. Typically, the switch means 24 comprises a normally open switch as illustrated in FIG. 1. For example, the switch 24 preferably comprises the ignition switch of the noted motor vehicle but can also comprise a switch operable in well known manner by the shifting of a transmission control from a parked position to one of the vehicle transmission drive positions.

Figure 2:
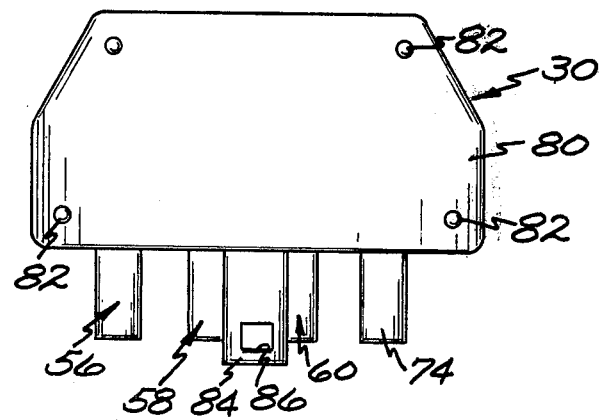
FIG. 2 is a plan view of a control device useful in the monitoring system of FIG. 1.

In accordance with this invention an additional switch means 26 is operable in response to fastening of the automotive seat belt means 16 in the noted motor vehicle to prevent operation of the audible signaling means 20 of the monitoring system. Typically, for example, the switch means 26 comprises a normally open switch such as is conventionally provided in seat belt mechanisms in some motor vehicles and which is adapted to be closed when the seat belt is fastened around an occupant of the motor vehicle, the switch being electrically connected to shunt the audible signaling means 20 as illustrated in FIG. 2. That is, the switch is electrically connected at one side to the resistor element 22 in series with the audible signaling means 20 and at its opposite side to the electrical ground 12 of the motor vehicle as shown in FIG. 1. Preferably, the switch 26 is adapted to be operated upon fastening of the seat belt allotted to the driver of the motor vehicle.

In accordance with this invention, an additional resistor element 28 of positive temperature coefficient of resistivity is connected in parallel with a visual signaling means and the resistor 22 in series therewith and in parallel with the audible signaling means and the resistor 22 in series therewith as shown in FIG. 1. Preferably, for example, the resistor element 28 utilized in the system 40 comprises a ceramic resistor element of lanthanum-doped barium titanate material which has a resistance of approximately 1.9 ohms at normal or room temperature but which, when energized at a voltage on the order of 10 to 16 volts, is adapted to be heated to a temperature of approximately 135°C. and to display a resistance of greater than 1000 ohms at said temperature.

Figure 3:
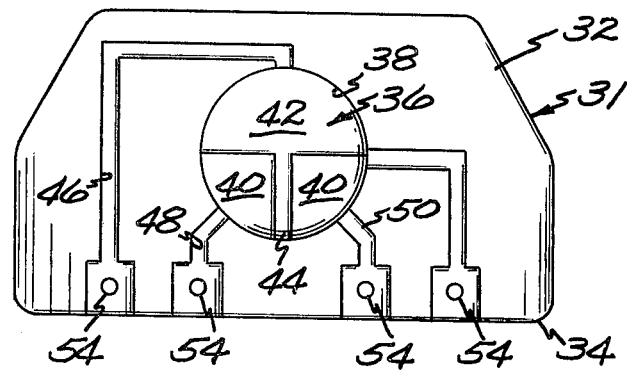
FIG. 3 is a plan view of a casing component utilized in the control device of FIG. 2.

In accordance with this invention, the resistor element 28 is disposed in a selected heat-transfer relation to each of the first resistor elements 22 as indicated by the lines 29 in FIG. 3. In this arrangement, when the first switch means 24 are operated in response to initiation of operation of the motor vehicle 12 while the seat belt 16 is not properly fastened so that the switch means 26 are in their normally open condition, the visual and audible signaling means 18 and 20 are each energized through respective resistance elements 22 while the resistance element 28 draws a substantial current to be heated rapidly to its operating temperature. In this way, the resistance element 28 serves as an electrical heater for heating the resistance elements 22 to their predetermined operating temperatures within a more precisely predetermined time delay after initiation of operation of the motor vehicle 12. That is, in a monitoring arrangement illustrated in FIG. 1, the resistor element 28 is adapted to be promptly heated to its operating temperature very quickly after initiation of motor operation so that effects of voltage variations from the power supply and variations in the ambient temperatures to which the resistor elements are subjected provide only very small variations in the time required to heat the resistor element 28 to its operating temperature. Similarly, where the resistor elements 22 are heated towards their operating temperatures to only a limited extent by the flow of electrical current through the resistor elements, such voltage variations in ambient temperature variations also contribute to only a limited extent to the heating of the resistors 22.

In accordance with this invention, the major part of the time delay for heating the resistor elements 22 to their operating temperatures after initiation of operation of the motor vehicle 12 is primarily determined by the heat-transfer relationship established between the resistor element 28 and the resistor elements 22. Preferably, the resistor element 28 is disposed in a selected heat-transfer relation to the resistors 22 to heat the resistor elements 22 to their operating temperatures within four to eight seconds after initiation of motor vehicle operation. If the vehicle driver properly fastens his seat belt 16 so that the normally open switch means 26 are closed in response to fastening of the seat belt, the audible signaling means 20 is shunted and operation of the audible signaling means is thereby prevented. When this occurs, the resistor element 22 in series with the audible signaling means then continues to be heated by the resistor element 28 and by the electrical current flowing through the resistor element 22 through the switch means 26 until the resistor element reaches its operating temperature at which the increase of resistivity of the resistor element 22 reduces current flow through the resistor to a very low level. The visual signaling means 18 remains energized after initiation of motor vehicle operation even though the seat belt 16 may be fastened for closing the switch means 26, the operation of the visual signaling means being terminated only after the desired time delay after initiation of motor operation when the resistor element 22 in series with the visual signaling means has been heated to its operating temperature as will be understood.

In accordance with this invention, the resistor elements 22 and 28 of the monitoring system 10 above-described are preferably incorporated in a control device 30. In this arrangement, as illustrated by the broken lines 30 in FIG. 1, the resistor elements are adapted to be conveniently combined with switch means 24 and 26 and signaling means 18 and 20 existing in present motor vehicles to provide the monitoring system 10 of this invention in a convenient and economical manner.

In a preferred embodiment of the control device 30 of this invention as illustrated in FIGS. 2–7, the control device includes a casing 31 of an electrically insulating material such as a phenolic resin or a glass filled nylon or the like. The casing has a top surface 32 which is preferably flat, and has a casing edge 34 adjacent the top surface of the casing as shown particularly in FIG. 3. The casing also has a cavity 36 which is open at the top surface of the casing and which has a side wall 38, a first cavity bottom portion 40 disposed at a level which is located at a selected spacing from the top surface of the casing, and has a second cavity bottom portion 42 disposed at a level located at a selected relatively lesser spacing from the top surface of the casing. Preferably, the casing also has a wall portion 44 upstanding from the first bottom portion of the casing cavity dividing said first bottom portion into two sections as shown in FIG. 3. In accordance with this invention, the casing 31 also has a plurality of slots 46, 48, 50 and 52 each of which is open at the top surface of the casing and each of which communicates between the casing cavity 36 and the casing edge 34. Preferably, casing stud portions 54 are upstanding from the casing within each of the casing slots adjacent the casing edge 34.

Figure 4:
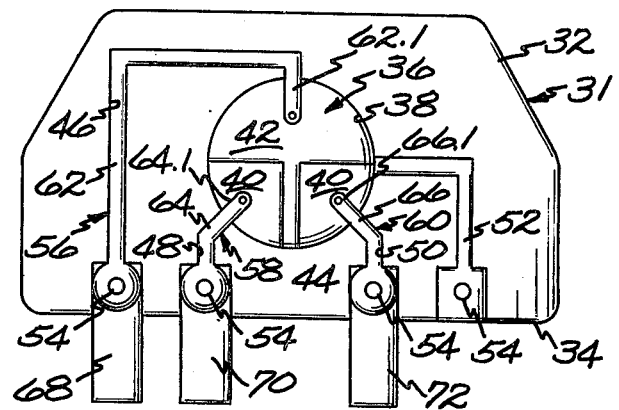
FIG. 4 is a plan view of portions of the control device of FIG. 2 illustrating steps in the assembly of the control device of FIG. 2.

In accordance with this invention, terminal means 56, 58 and 60 are disposed in respective slots 46, 48 and 50 of the casing. Preferably, the terminal means 56, 58 and 60 incorporate respective spring portions 62, 64 and 66 each of which have one end thereof 62.1, 64.1 and 66.1 extending into the casing cavity 36. Preferably these terminal spring portions 62, 64 and 66 are formed of an electrically conductive resilient spring material such as beryllium copper and are provided with a dimple at the end of said spring portions which extend into the casing cavity. Preferably also, the ends of the spring portions 62, 64 and 66 which extend into the cavity bear against the cavity bottom portions 40 and 42 as illustrated particularly in FIG. 4. Preferably the opposite ends of the spring portions 62, 64 and 66 are each provided with a central aperture which is fitted over a respective casing stud portion 54 as illustrated in FIG. 4. Preferably also the terminal means 56, 58 and 60 also include terminal extension portions 68, 70 and 72 respectively each of which has an aperture at one end fitted over a respective casing stud portion 54 as illustrated in FIG. 4 and has an opposite end portion of the terminal extension means extending from the casing at said casing edge 34.

Figure 5:
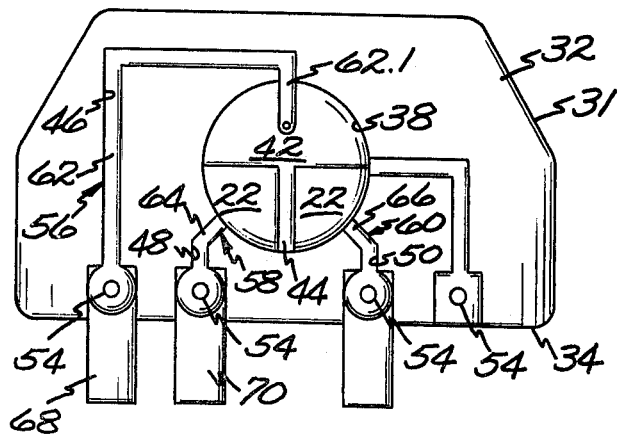
FIG. 5 is a plan view similar to FIG. 4 illustrating further steps in the assembly of the control device of FIG. 2.

In accordance with this invention the resistor elements 22 and 28 described above with reference to FIG. 1 are preferably provided in the form of thin, disc-like layers of ceramic material having broad flat opposite side surfaces thereof provided with resistor contact material (not shown) as by metallizing the broad flat disc surfaces of the resistor elements. The resistor element 28 is preferably formed of a round configuration while the resistor elements 22 are preferably formed as one quarter quadrants of such a round configuration. Thus, as illustrated particularly in FIG. 5, the two resistor elements 22 are adapted to be disposed within the casing cavity 36 to electrically engage the ends 64.1 and 66.1 of the spring portions of the terminal means 58 and 60 as shown in FIG. 5. That is, the end 64.1 and 66.1 of the spring terminal portions are engaged with the flat disc surfaces of the resistor elements 22 opposite from those viewed in FIG. 5 as will be understood.

Figure 6:
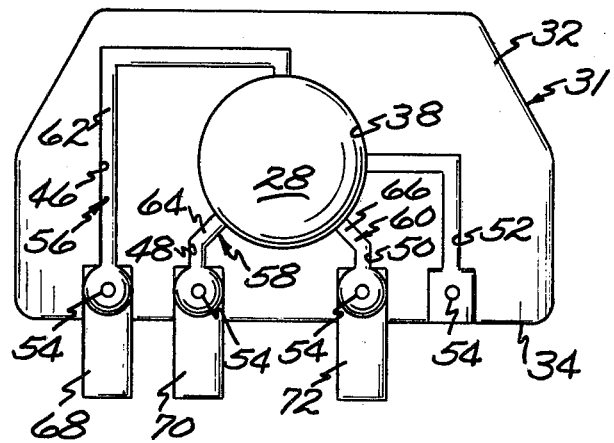
FIG. 6 is a plan view similar to FIGS. 4 and 5 illustrating still further steps in the assembly of the control device of FIG. 2.

In accordance with this invention, the resistor element 28 of round configuration is then disposed within the casing cavity 36 as illustrated in FIG. 6 so that the flat contact surfaces of the resistor elements 22 which are viewed in FIG. 5 are electrically engaged with limited parts of the broad flat contact surface of the element 28 which is opposite from the contact surface of the resistor 28 which is viewed in FIG. 6. Further, in this arrangement, the resistor element 28 is disposed in a precisely controlled heat-transfer relation to each of the resistor elements 22 as will be understood. Further, said opposite side of the resistor element 28 is also disposed in electrical engagement with the end 62.1 of the spring portion of the terminal means 56.

Figure 7:
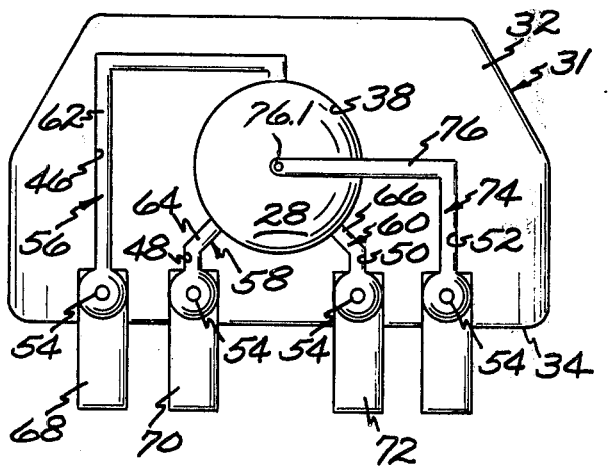
FIG. 7 is a plan view similar to FIGS. 4-6 illustrating still further steps in the assembly of the control device of FIG. 2.

In accordance with this invention, an additional terminal means 74 is then disposed within the casing slot 52 as is best illustrated in FIG. 7. As shown, the terminal means 74 preferably includes an electrically conductive resilient spring portion 76 having one end 76.1 extending over the casing cavity 36 to engage the broad flat contact surface of the resistor 28 which is viewed in FIG. 7. The opposite end of the spring portion 76 of the terminal means 74 has an aperture fitted over a stud portion of the casing upstanding within the casing slot 52. A terminal extension portion 78 of the terminal means 74 is also provided with an aperture fitted over the stud portion of the casing upstanding within the casing slot 52 and has an opposite end extending from the casing at the casing edge 34 as shown in FIG. 7.

Finally, in accordance with this invention, a flat, disc-like casing cover 80 is disposed on top of the top surface 32 of the casing and is riveted or otherwise secured to the casing 31 as indicated at 82 in FIG. 1. Preferably the thickness of the resistor elements 22 and 28 are proportioned with respect to the thicknesses of the terminal means of the connector device 30 and with respect to the depth of the cavity 36 in the casing 31 of the device so that securing of the cover 80 to the casing 31 resiliently presses the spring portion 76 of the terminal means 74 firmly into electrical engagement with the resistor 28 and resiliently presses the resistor element 28 into firm electrical engagement with the resistors 22 and with the terminal means 56 while also firmly pressing the resistor elements 22 into electrical engagement with the terminal means 64 and 66 as will be understood. Similarly, the thicknesses of the spring portions and terminal extension portions of the terminal means of the device 30 are proportioned relative to the depths of the casing slots 46, 48, 50 and 52 so that the spring portion of each of said terminal means is pressed into firm electrical engagement with the extension portion of said terminal means within said casing slots by the casing cover 80. Preferably, the casing cover has an extending, integral tab portion 84 having a central aperture 86.

In this arrangement, the electrical control device 30 above-described is particularly adapted to be plugged into a suitable receptacle in a motor vehicle so that the extending portions of the device terminal means are electrically connected with great convenience to the other components of the seat belt monitoring system 10 illustrated in FIG. 1 as will be understood. The tab portion 84 of the device cover is adapted to fit over a detent on such a receptacle for firmly locking the control device to such a receptacle in a conventional manner. Further, the control device 30 is characterized by being compact, rugged and of extremely inexpensive construction. On the other hand, the resistor elements within the control device are electrically interconnected with each other and with device terminal means in a secure and reliable manner.

It should be understood that although various embodiments of the seat belt monitoring system and control device of this invention has been described by way of illustrating the invention, this invention includes all modifications and equivalents thereof falling within the scope of the appended claims.

We claim:

1. A seat belt monitoring system for a motor vehicle having seat belt means and electrical power supply means comprising electrically operable audible signaling means, electrically operable visual signaling means, first switch means operable in response to initiation of motor vehicle operation for electrically connecting said audible and visual signaling means in parallel to said power supply to permit operation of said signaling means, additional switch means operable in response to fastening of said seat belt means to prevent operation of said audible signaling means when said seat belt means is fastened, a first resistor means of positive temperature coefficient of resistivity which displays a sharp increase in resistivity in response to heating of said first resistor means to a predetermined operating temperature, said first resistor means being disposed in series with said visual signaling means and said power supply to prevent operation of said visual signaling means when said first resistor means is heated to its predetermined operating temperature, a second resistor means of positive temperature coefficient of resistivity which displays a sharp increase in resistivity in response to heating of said second resistor means to a predetermined operating temperature, said second resistor means being disposed in series with said audible signaling means and said power supply to prevent operation of said audible signaling means when said second resistor means is heated to its predetermined operating temperature, and electrical heater means disposed in selected heat-transfer relation to said first and second resistor means operable in response to initiation of said motor vehicle operation to heat said first and second resistor means to said predetermined operating temperatures for said first and second resistor means with selected time delay after initiation of said motor vehicle operation.

2. A seat belt monitoring system as set forth in claim 1 wherein said electrical heater means comprises a self-regulating resistance heater element of positive temperature coefficient of resistivity.

3. A seat belt monitoring system as set forth in claim 2 wherein said self-regulating heater element is electrically connected in parallel with said first resistor means and with said second resistor means.

4. A seat belt monitoring system for a motor vehicle having seat belt means and electrical power supply means comprising a first resistor of positive temperature coefficient of resistivity which displays a sharp increase in resistivity when heated to a predetermined operating temperature for reducing electrical current flow through said first resistor to a very low level, an electrically operable visual signaling means electrically connected in series with said first resistor, a second resistor of positive temperature coefficient of resistivity which displays a sharp increase in resistivity when heated to a predetermined operating temperature for reducing electrical current flow through said second resistor to a very low level, an electrically operable audible signaling means electrically connected in series with said second resistor, first switch means operable in response to initiation of said motor vehicle operation to electrically connect said first resistor and visual signaling means in parallel with said second resistor and audible signaling means to said power supply for permitting operation of said signaling means, additional switch means operable in response to fastening of said seat belt means to prevent operation of said audible signaling means when said seat belt means is fastened, and a third electrical resistor of positive temperature coefficient of resistivity adapted to be heated to a predetermined operating temperature by directing electrical current therethrough and to display a sharp increase in resistivity at said predetermined operating temperature for reducing current flow through said third resistor to a very low level, said third resistor being electrically connected in parallel with said first resistor and visual signaling means and with said second resistor and audible signaling means upon operation of said first switch means for heating said third resistor to said predetermined operating temperature for said third resistor, said third resistor being disposed in selected heat-transfer relation to said first and second resistors for heating said first and second resistors to said predetermined operating temperatures for said first and second resistors with selected time delay after initiation of said motor vehicle operation to prevent operation of said audible and visual signaling means after said selected time delay.

5. A seat belt monitoring system as set forth in claim 4 wherein said additional switch means comprises normally open switch means operable in response to fastening of said seat belt means to shunt said audible signaling means for preventing operation of said audible signaling means.

6. An electrical control device comprising a casing of electrically insulating material having a top surface, having a casing edge adjacent said top surface, and having a cavity in said top surface, said cavity having a side wall, a first cavity bottom portion having selected spacing from said top surface and having a second cavity bottom portion at a selected relatively lesser spacing from said top surface, said casing having at least three slots open at said top surface communicating between said cavity and said casing edge, first and second electrically conductive terminal means disposed in first and second of said casing slots respectively, each of said first and second terminal means having one end extending into said cavity and having an opposite end extending from said casing at said casing edge, a first ceramic resistor element of positive temperature coefficient of resistivity which displays a sharp increase in resistivity when heated to a predetermined operating temperature, said first resistor element being disposed in said casing cavity in electrical engagement with said one end of said first terminal means, a second ceramic resistor element of positive temperature coefficient of resistivity which displays a sharp increase in resistivity when heated to a predetermined operating temperature, said second resistor being disposed in said casing in selected heat-transfer relation to said first resistor element and in electrical engagement with said first resistor element and with said one end of said second terminal means, and a third terminal means disposed in the third of said casing slots having one end thereof extending over said cavity to electrically engage said second resistor element and having an opposite end extending from said casing at said casing edge, and cover means secured to said casing over said top surface retaining said terminal means and said resistor elements in said assembled relation.

7. An electrical control device comprising a casing of electrically insulating material having a top surface, having a casing edge adjacent said top surface, and having a cavity in said top surface, said cavity having a side wall, a pair of first cavity bottom portions at a selected spacing from said top surface and having a second cavity bottom portion at a selected relatively lesser spacing from said top surface, said casing having a wall portion upstanding between said pair of said first cavity bottom portions for electrically isolating said cavity bottom portions from each other, said casing having at least four slots open at said top surface communicating between said cavity and said casing edge, first, second and third electrically conductive terminal means disposed in first, second and third of said casing slots respectively, said first, second and third terminal means each having one end extending into said cavity and having an opposite end extending from said casing at said casing edge, a pair of first ceramic resistor elements of positive temperature coefficient of resistivity which each display a sharp increase in resistivity when heated to a predetermined operating temperature, said first resistor elements being disposed in said casing cavity in electrical engagement with said one end of said first and second terminal means respectively, a second ceramic resistor element of positive temperature coefficient of resistivity which displays a sharp increase in resistivity when heated to a predetermined operating temperature, said second resistor element being disposed in said casing cavity in selected heat-transfer relation to each of said first resistor elements, in electrical engagement with each of said first resistor elements, and in electrical engagement with said third terminal means, and a fourth terminal means disposed in the fourth of said casing slots having one end thereof extending over said cavity to electrically engage said second resistor element and having an opposite end extending from said casing at said casing edge, and cover means secured to said casing over said top surface retaining said terminal means and said resistor elements in said assembled relation.

8. An electrical control device as set forth in claim 7 having casing stud portions upstanding in respective casing slots adjacent said casing edge, having spring portions of each of said terminal means formed of electrically conductive resilient spring material, said spring portions of said terminal means each having one end extending into said casing cavity to electrically engage one of said resistor elements and each having an aperture adjacent the opposite end thereof fitted over respective casing stud portions in said casing slots, and having extension portions of said terminal means each having an aperture adjacent one end fitted over respective casing stud portions on said casing slots in electrical engagement with respective spring portions of said terminal means in said slots and each having an opposite end extending from said casing at said casing edge, said cover means retaining said spring and extention portion of each of said terminal means in said electrical engagement with each other.

* * * * *